(12) United States Patent
Peeters et al.

(10) Patent No.: US 7,259,594 B2
(45) Date of Patent: Aug. 21, 2007

(54) ELECTRONIC CIRCUIT WITH A CHAIN OF PROCESSING ELEMENTS

(75) Inventors: Adrianus Marinus Gerardus Peeters, Eindhoven (NL); Cornelis Hermanus Van Berkel, Eindhoven (NL); Mark Nadim Olivier De Clercq, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/571,953

(22) PCT Filed: Aug. 30, 2004

(86) PCT No.: PCT/IB2004/051599

§ 371 (c)(1),
(2), (4) Date: Mar. 13, 2006

(87) PCT Pub. No.: WO2005/026927

PCT Pub. Date: Mar. 24, 2005

(65) Prior Publication Data

US 2007/0052448 A1  Mar. 8, 2007

(30) Foreign Application Priority Data

Sep. 16, 2003 (EP) .................................. 03103399

(51) Int. Cl.
*H03K 19/00* (2006.01)

(52) U.S. Cl. .......................................... 326/93; 326/96

(58) Field of Classification Search ................... 326/93
See application file for complete search history.

(56) References Cited

U.S. PATENT DOCUMENTS 5,983,339 A * 11/1999 Klim ........................... 712/200
6,320,418 B1 * 11/2001 Fujii et al. ..................... 326/93
6,377,077 B1 * 4/2002 Shiraishi ....................... 326/93

OTHER PUBLICATIONS

Papachristou Christos et al: "A Multiple Clocking Scheme for Low Power RTL Design"; IEEE Transactions on a Very Large Scale Integration (VLSI) Systems; vol. 7 No. 2; Jun. 1999, pp. 266-276.

* cited by examiner

*Primary Examiner*—James H. Cho

(57) ABSTRACT

A chain of processing element (10a, 10, 10b) with a logic circuit (14) and a storage element (12) is provided. The storage elements (12) of all except a final processing element (10b) in the chain have one or more outputs coupled to the logic (14) of a next processing element (10a, 10, 10b) in the chain. A timing circuit (16) controls respective loading time points at which the storage elements (12) load data from the logic circuits (14) in respective ones of the processing elements (10a, 10, 10b). The data is loaded progressively later in processing elements (10a, 10, 10b) that successively precede one another in the chain. The time interval between successive loading time points of the final processing element (10b) includes loading time points of loading all processing elements (10a, 10) other than the final processing element (10).

6 Claims, 5 Drawing Sheets

ELECTRONIC CIRCUIT WITH A CHAIN OF PROCESSING ELEMENTS

This application is a U.S. National Stage application of International Application No. PCT/IB04/51599filed Aug. 30, 2004, and claims priority to European Patent Application EPO03103399.6 filed Sep. 16, 2003.

The invention relates to an electronic circuit with a chain of processing elements.

Pipelining is a conventional technique to increase the throughput of electronic circuits. In a pipelined circuit the logic circuit is split into sections and successive sections are coupled via storage elements. A clock signal causes results produced by the sections to be loaded into the storage elements at the end of the sections at the end of a clock period. During the next clock period the results of each section is supplied to the next section.

Such pipelined circuits exhibit power consumption peaks around the clock edges, for loading data into the storage elements, and subsequently developing new results. The current peaks may cause interference problems and put high demands on the power supply. One way to avoid interference problems and to reduce power consumption has been to use asynchronous circuits, in which the loading time points are not centrally controlled, but propagate along the chain, by using handshakes that allow data to be loaded once the result of processing predecessor data has been captured. When the chain is heavily loaded with data, however, asynchronous handshakes produce a similar current peak effect.

An electronic circuit with a chain of processing elements is described in an article by Christos A. Papachristou et al, titled "A multiple clocking scheme for low power RTL design" and published in the IEEE transactions on very large scale integration (VLSI) systems, Vol. 7 No 2 (June 1999), pages 266-276.

Papachristou et al describe how power consumption of an electronic circuit can be reduced by implementing successive steps of a computation in successive processing elements in a chain of processing elements. Papachristou's starting point is a circuit in which the same processing element is used repetitively to execute different steps of a computation, at least one step using the results of an immediately preceding step. Papachristou proposes to provide additional processing elements, so that no processing element needs to use results that it has produced in an immediately preceding processing step. Thus, in each processing element data loading can be skipped every second clock cycle, successive processing elements requiring loading in the even and odd clock cycles respectively. As a result the clock frequency of the processing elements is halved, with the effect of reducing power consumption.

Papachristou illustrates this reduction in power consumption by means of a circuit that uses two non overlapping clocks to load data from alternating processing elements from the chain respectively. Papachristou also mentions that more than two non-overlapping clocks can be used so that groups of successive processing elements from the chain each load data under control of a respective clock signal. However, no example is given of this. Papachristou describes how such a circuit can be designed by taking a schedule of computations, in which computation steps have been assigned to time slots "t" (t=0, 1, 2, 3 . . . ). Non overlapping clocks Pk (k=0, 1, . . n−1; n being the number of non-overlapping clocks) are defined which produce load pulses at time point t=M*n+k (M being any integer). Each computation step that is scheduled at a time t is assigned to a processing element that is clocked with a clock Pk, where k=t mod n. Thus, successive processing elements are clocked progressively as they are further along the chain. As a result, the current peaks are reduced.

Papachristou's circuit makes sub-optimal use of the processing capacity of the chain. As Papachristou discloses, this can be improved by overlapping execution of the end of one series of processing steps with the start of the next series of processing steps. Thus, a partial form of pipe-lining is realized, in which a number of processing elements at the start of the chain is already executing the steps of a computation, while a number of final processing elements in the chain is still executing steps of a previous computation. This increases processing speed, or, when the clock frequency is reduced so that the processing speed remains the same, it decreases power consumption.

Among others, it is an object of the invention to provide for an electronic data processing circuit in which high current peaks are reduced and which makes more efficient use of processing capacity.

The electronic circuit according to the invention is set forth in claim 1. According to the invention the loading time points of storage elements in a chain of processing circuits progress backward along a chain of at least three processing elements before a next loading time point of the final processing element in the chain. The more processing elements are progressively loaded before the final processing element is loaded again the lower the current peaks. On the other hand, by using backward progress of the time points a maximum time interval is realized to develop results in a processing element. This facilitates efficient use of processing capacity. Moreover, latches may be used as storage elements, which do not block signals from passing from the logic circuits of one processing circuit to the next during a loading pulse. This simplifies the circuit, reduces its power consumption and/or increases its speed.

In an embodiment the loading time points are controlled by a synchronous clock circuit, that generates a plurality of periodic clock signals of the same frequency, but with progressively delayed phase, and applies these clock signals to the processing elements. In another embodiment the loading time points are controlled asynchronously, by means of handshake signals passing backward along the chain and a handshake signal back from the start of the chain to the final processing element to start a next wave of loading time points.

It will be appreciated that the claimed chain may in fact be a sub-chain of a larger chain of processing elements that have progressively later loading time points as one moves back along the larger chain. In this case a loading time point from a wave may occur at the final processing element in the sub-chain before the previous wave has progressed to the start of the larger chain, once the previous wave has progressed past the initial processing element of the sub-chain.

These and other objects and advantageous aspects of the invention will be described using the following figures.

Figure 1:
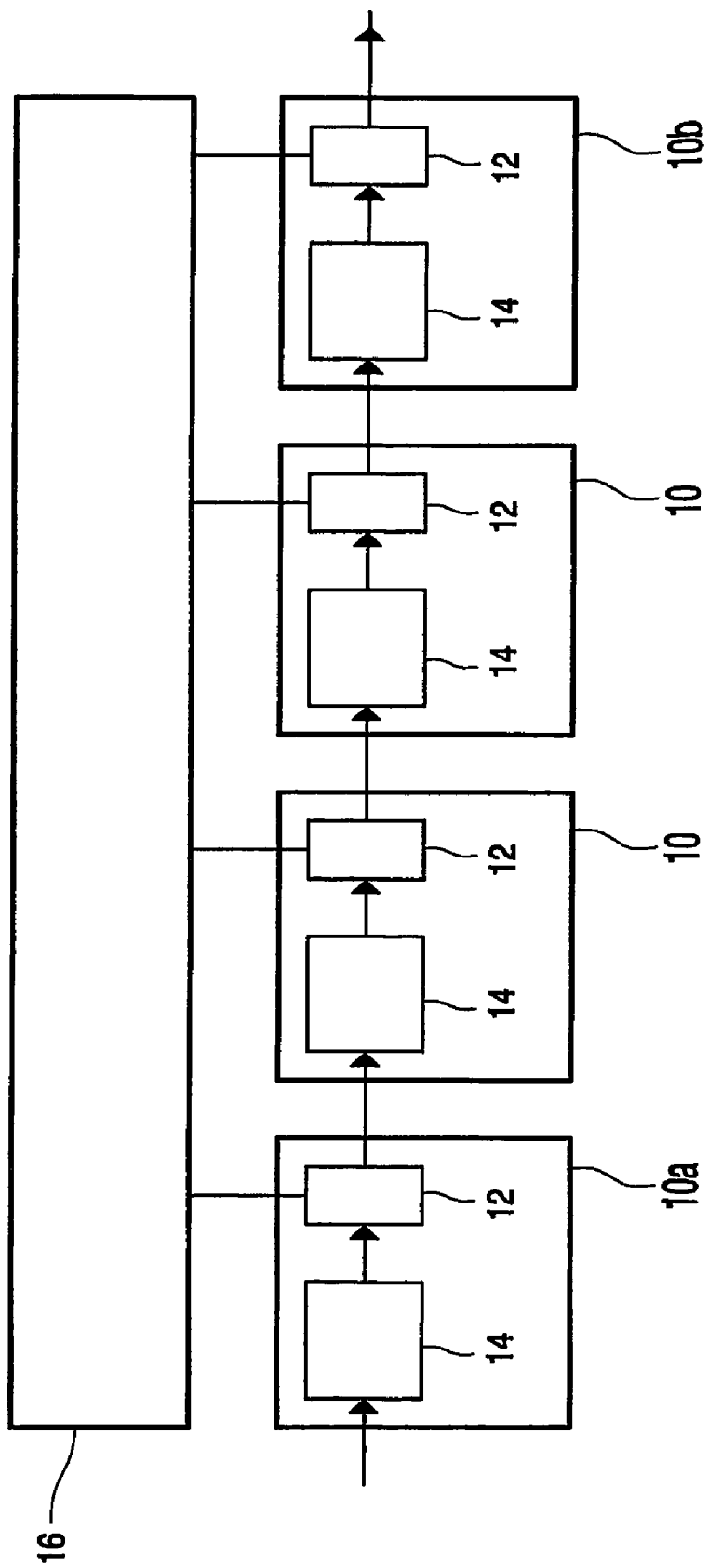
FIG. 1 shows a data processing circuit

FIG. 1 shows a data processing circuit that contains a timing circuit 16 and a chain of processing elements 10a, 10, 10b, each containing a storage element 12 and a logic circuit 14. Each storage element has an input and an output. The input is coupled to an output of the processing element of the logic circuit 14. The output is coupled to an input of the logic circuit 14 in the next processing element in the chain. Although single lines are used to symbolize the inputs and outputs, it should be appreciated that each storage element 12 may provide for receiving and outputting its own plurality of bits in parallel. Timing circuit 16 has outputs coupled to control inputs of respective ones of the storage elements.

In operation, logic circuits 14 form output signals as a function of input signals applied to their inputs. Any kind of logical operation may be realized, using for example NAND gates, NOR gates, inverters etc. (not shown). Upon a timing signal from timing circuit 16 the storage element 12 of a processing element 10 stores the data output signals from the logic circuit 14 of the processing element and supplies these signals to the next processing element.

Figure 2:
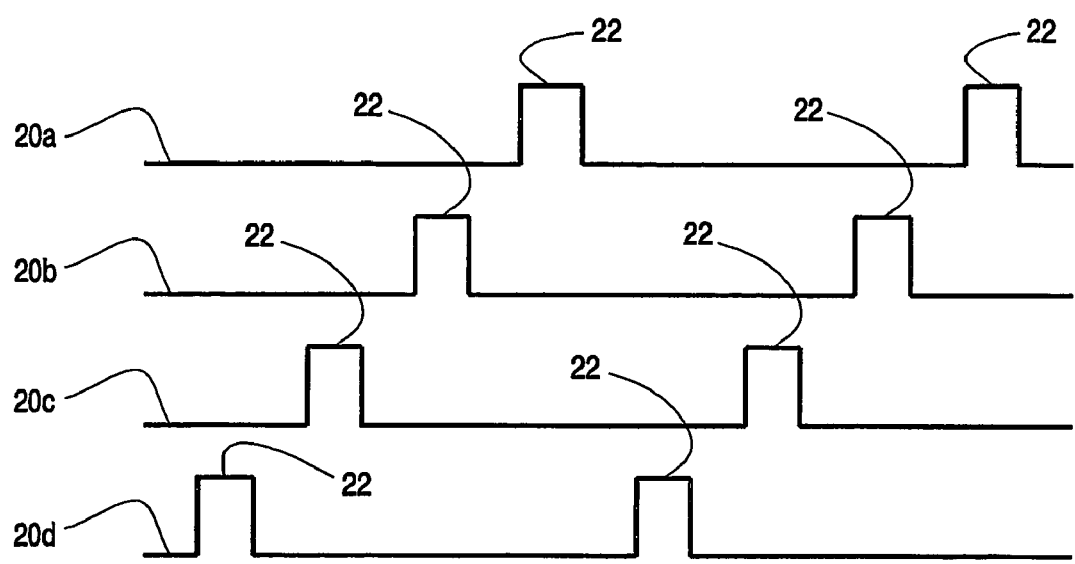
FIG. 2 shows clock signals for use in the data processing circuit

FIG. 2 shows timing signals used in the circuit. The figure shows four traces 20a-d of timing signals applied to the storage element of successive processing elements 10, that is, first trace 20a shows the timing signal of an initial processing element 10a, second trace 20b shows the timing signal of a second processing element 10 that receives data directly from logic circuit 14 of the initial processing element, third trace 20c shows the timing signal of a third processing element 10 that receives data directly from logic circuit 14 of the second processing element, and so on until the final processing element 10b of the chain. As can be seen the timing signals contain pulses 22, so that processing elements 10 that are located successively further down the chain in the direction of signal flow receive progressively earlier pulses.

Storage elements 12 preferably are latches, i.e. known circuits that pass signals from their inputs to their outputs when a pulse is applied, and between pulses 22 hold the output signal to a value that was present at the end of a pulse 22. This ensures a circuit with little overhead. However, larger circuits, such as flip-flops that load data on an edge of applied pulses 22 may be used as well.

As will be appreciated the timing of the pulses has the effect that first data is loaded in storage element 12 of the final processing element 10b in the chain, then in the next preceding processing element 10 and so on until data is loaded in the initial processing element 10a. Only subsequently new data is loaded in final processing element 10b, after which a new wave of loading data in successively more upstream processing elements 10 begins. Thus, logic circuits 14 get almost the entire time interval to develop output signals before these output signals are latched (or otherwise stored) in the following processing element 10.

Although the invention has been realized for a chain of four processing elements 10, it will be realized that the chain may contain any number n of processing elements 10, in which case there are n different timing signals, so that processing elements that are successively further downstream receive successively earlier pulses 22 and all processing elements 10 receive pulses before the final processing element 10b receives a next pulse 22.

The timing signals 20a-b may be generated for example by using a central clock circuit, and a Johnson counter that produces clock pulses at successive outputs in successive clock cycles of the central clock. Alternatively, n phase locked loops may be used, each designed to lock onto the central clock with a different phase.

Figure 3:
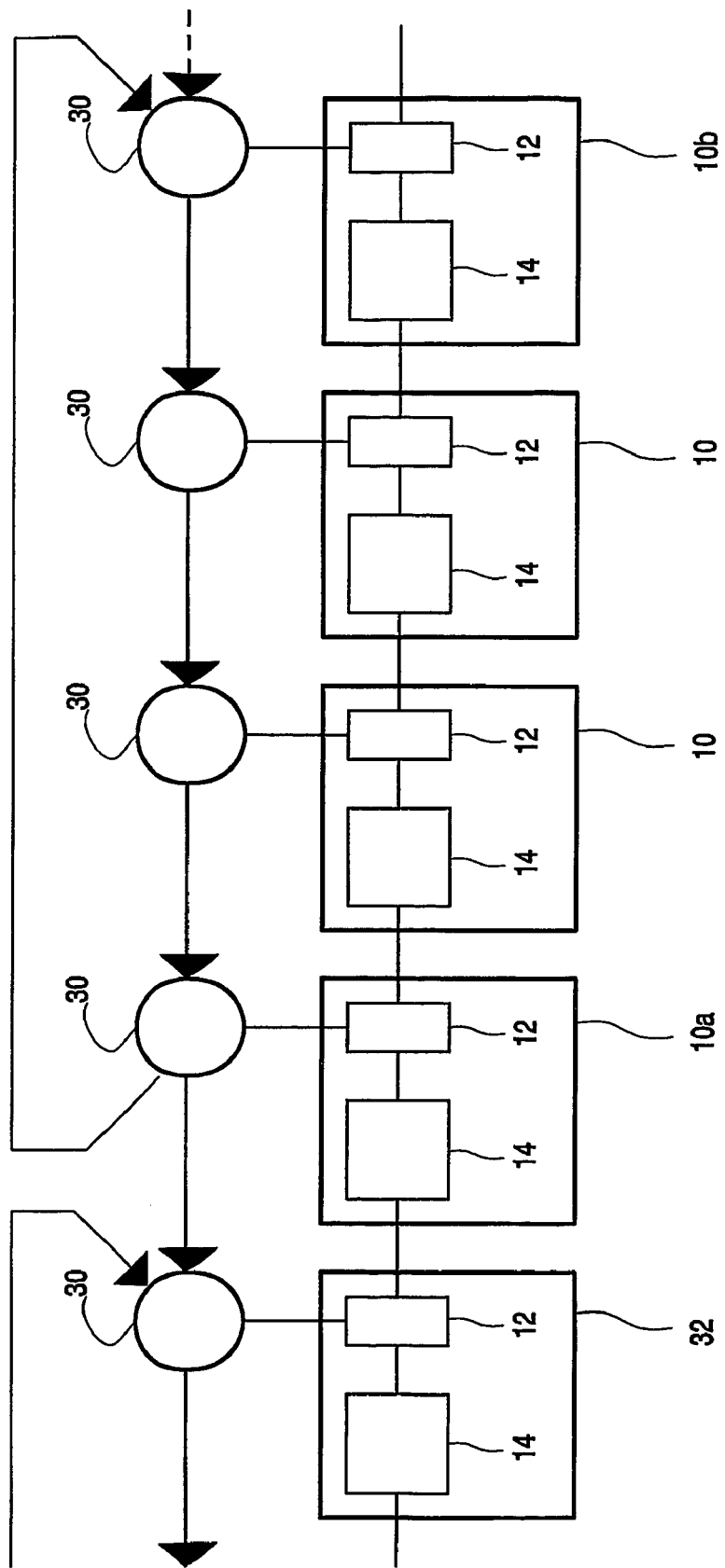
FIG. 3 shows a further data processing circuit

FIG. 3 shows an embodiment wherein an asynchronous circuit is used to generate the timing signals. The figure shows a chain with four processing elements 10, 10a, 10b and a further processing circuit 32 that precedes the chain and has an output of a storage element 12 coupled to the initial processing element 10 of the chain. The further processing circuit 32 is the final processing element of a further chain (not shown).

The circuit contains a series of local timing circuits 30 that pass pulses with a delay. Each local timing circuit 30 has a timing output coupled to the storage element 12 of a respective one of the processing elements 10. Local timing circuits 30 are mutually coupled in a chain to pass timing signals in a direction that is the opposite of the direction at which data travels through the chain of processing elements 10, so that each local timing circuit 30 first delays an incoming timing signal, then causes the storage element 12 of its corresponding processing element 10 to load data and then passes the timing signal to the local timing circuit 30 for the next preceding processing element 10 in the chain. The local timing circuit 30 of the initial processing element 10a feeds back a timing signal to the local timing circuit 30 of the final processing element 10b of the chain to start a next wave. The local timing circuit 30 of the initial processing element 10a also supplies a timing signal to the further processing element 32, so that timing signals will propagate upstream along the further chain concurrently with the next wave of timing signals from final processing element 10b.

Preferably, the local timing circuit 30 of the further processing element 32 is arranged to hold up the pulse that it passes upstream until a pulse has been received both from the start of the further chain and local timing circuit 30 of initial processing element 10a of the chain. Preferably, the local timing circuit 30 of final processing element 10b may be designed to hold up the pulse that it passes upstream until a pulse has been received both from local timing circuit 30 of initial processing element 10a of the chain and an external timing signal.

Local timing circuits 30 may be realized as delay circuits, e.g. as a chain of inverters, optionally including a logic gate to hold up the pulses 22 at the final processing element 10b. In another embodiment, part or all of local timing circuits may operate dependent on the data processed by processing elements 10.

Figure 3A:
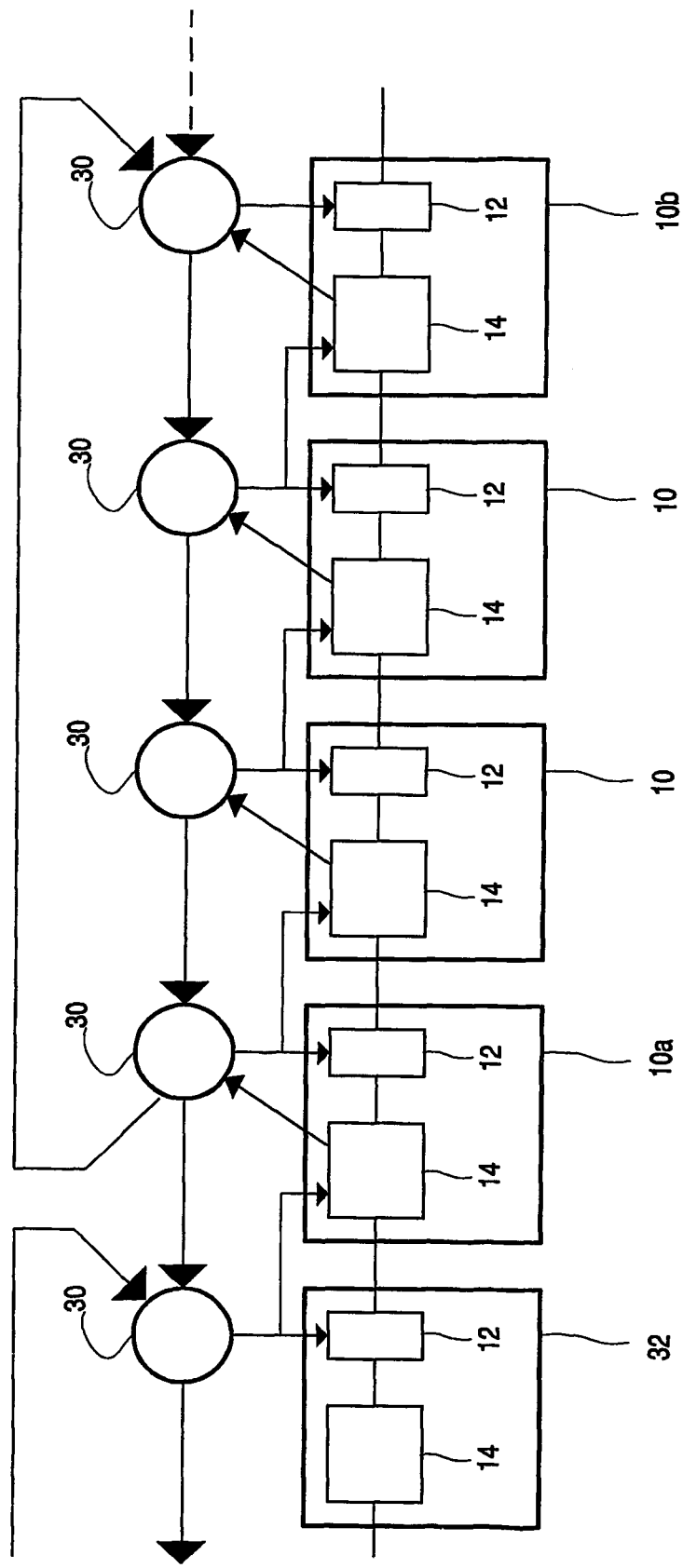
FIG. 3a shows an alternative further data processing circuit

FIG. 3a shows an example where local timing circuits 30 are coupled to processing elements 14 to indicate the start of a cycle and to receive a signal when processing element has finished processing the data for that cycle, dependent on the data that is processed. For example, the time to perform an operation like multiplication, or data-dependent communication with other stages in the pipeline may depend on the data values that are processed. In this case local timing circuit 30 preferably adapts the delay so that the pulses are passed once the operation for the particular current data value has finished. The necessary time interval may be estimated from the data values, or detected from some processing result. Thus, the delay may vary, making it possible to realize a higher overall speed than with synchronous circuits, which have to account for a worst case delay.

As an alternative handshake circuits may be used, which receive request signals, to generate a pulse 22, and acknowledge the request signal when the pulse has been generated. The handshake circuit of a processing element 10 generates a request for the handshake circuit of the next preceding processing element 10 in the chain if that handshake circuit has acknowledged the preceding request.

Figure 4:
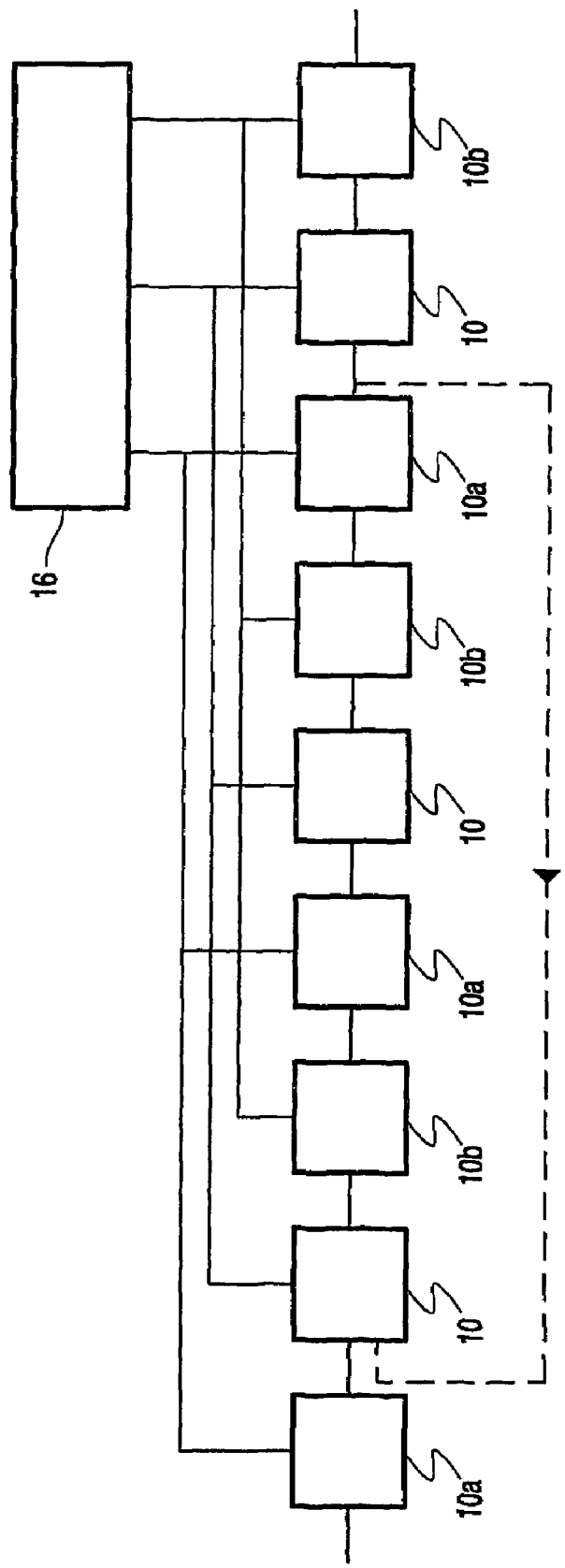
FIG. 4 shows a chain of processing elements

FIG. 4 shows an example of a circuit with a larger chain of processing elements 10, 10a, 10b that is composed of successive sub-chains of the type shown in FIG. 1 (each sub-chain containing n=3 processing elements 10, 10*a*, 10*b*). In this example every nth processing element 10, 10*a*, 10*b* receives the same timing signal. Each sub-chain operates as described for FIG. 1. In this case, multiple waves of timing pulses travel down the larger chain concurrently. It will be appreciated that alternatively such a chain may be controlled with asynchronous circuits that generate the timing signals for different processing elements 10 separately.

Although each sub-chain is shown to contain the same number n of processing elements, it will be appreciated that the number of processing elements in different sub-chains may be mutually different. In case of a synchronous circuit this requires that as many different clock signals are available as there are processing elements in the largest sub-chain. Sub-chains with less processing elements use a subset of these clock signals.

Although the invention has been shown for a feed forward chain, wherein data travels forward only through the chain, it will be appreciated that there may be feedback connections to make part of the data travel backward along the chain. In this case however, the data from any particular processing element is preferably fed back only to the inputs of one or more processing elements that are a multiple of n processing elements back along the chain from the particular processing element, and/or only to data processing elements that directly follow data processing elements that receive the same timing signal as the particular processing element. An example of such an optional feedback is shown in FIG. 4.

The invention claimed is:

1. An electronic circuit, comprising:
   a chain of at least three processing elements each processing element comprising a logic circuit and a storage element for storing data output by the logic circuit the storage elements of all except a final processing element in the chain having one or more outputs coupled to the logic circuit of a next processing element in the chain,
   a timing circuit arranged to control respective loading time points at which the storage elements load data from the logic circuits in respective ones of the processing elements so that data is loaded progressively later in processing elements that successively precede one another in the chain, a time interval between successive loading time points of the final processing element including loading time points of loading all processing elements other than the final processing element, wherein the timing circuit further comprises an asynchronous circuit arranged to enable loading by the storage element of a respective one of the processing elements each time in response to a signal that a succeeding one of the processing elements that succeeds the respective one of the processing elements in the chain has loaded data, except for loading by the storage element of the final processing element, which the asynchronous circuit enables to load data each time in response to a signal that an initial one of the proessing elements has loaded data.

2. An electronic circuit according to claim 1, wherein the timing circuit is a synchronous clock generator, arranged to generate respective periodic clock signals, each to control the loading time point for a respective one of the processing elements the respective clock signals having equal repetition frequencies and matually different phase.

3. An electronic circuit according to claim 1, wherein the storage element of at least one of the processing elements comprises a latch between the logic circuit of the at least one of the processing elements and the next successive processing element in the chain, the latch permitting signal changes produced by the logic circuit of the a least one of the processing elements to pass to the next successive processing element during pulses that mark the loading time points, the latch holding a last input data value outside the pulses.

4. An electronic circuit, comprising:
   a chain of at least three processing elements, each processing element comprising: a logic circuit and a storage element adapted to store data output by the logic circuit, wherein the storage elements of all except a final processing element in the chain having one or more outputs coupled to the logic circuit of a next processing element in the chain;
   a further chain of processing elements, which precedes the chain, the further chain comprising: at least three processing elements each processing element comprising a logic circuit and a storage element adapted to store data output by the logic circuit, wherein the storage elements of all except a final processing element in the further chain have one or more outputs coupled to the logic circuit of a next processing element in the further chain, the storage element of the final processing element in the futher chain being coupled to an initial one of the processing elements in the chain; and
   a timing circuit arranged to control respective loading time points at which the storage elements load data from the logic circuits in respective ones of the processing elements so that data is loaded progressively later in processing elements that successively precede one another in the chain, a time interval between successive loading time points of the final processing element including loading time points of loading all processing elements other than the final processing element wherein the timing circuit is arranged to control the loading time points of the further chain so that data are loaded progressively later in processing elements that successively precede one another in the further chain, the storage elements of final processing elements in the chain and the further chain having substantially coinciding loading time points.

5. An electronic circuit according to claim 4, wherein the timing circuit comprises a synchronous clock generator arranged to generate respective periodic clock signals, wherein each periodic clock signal is adapted to control the loading time point for a respective one of the processing elements the respective clock signals having equal repetition frequencies and mutually different phase.

6. An electronic circuit according to claim 4, wherein the storage element of at least one of the processing elements comprises a latch between the logic circuit of the at least one of the processing elements and the next successive processing element in the chain, the latch permitting signal changes produced by the logic circuit of the at least one of the processing elements to pass to the next successive processing element during pulses that mark the loading time points, the latch holding a last input data value outside the pulses.

* * * * *